United States Statutory Invention Registration [19]

[11] Reg. Number: H160

Perry [43] Published: Nov. 4, 1986

[54] INTEGRAL STRUCTURAL WARHEAD SHELL

[75] Inventor: John S. Perry, Seattle, Wash.

[73] Assignee: The United States of America as represented by the Secretary of the Army, Washington, D.C.

[21] Appl. No.: 812,602

[22] Filed: Dec. 23, 1985

[51] Int. Cl.[4] ..... F42B 13/18
[52] U.S. Cl. ..... 102/494
[58] Field of Search ..... 102/383, 473, 491–497, 102/489

[56] References Cited

U.S. PATENT DOCUMENTS

| | | | |
|---|---|---|---|
| 1,300,333 | 4/1919 | Berry | 102/493 X |
| 3,971,290 | 7/1976 | Blain | 89/1.14 |
| 4,172,407 | 10/1979 | Wentink | 102/489 |
| 4,323,012 | 4/1982 | Driver, Jr. | 102/489 |

*Primary Examiner*—Harold J. Tudor

*Attorney, Agent, or Firm*—Harold W. Hilton; Freddie M. Bush; Anthony T. Lane

[57] ABSTRACT

A missile having a forward warhead section. The missile warhead section includes a skin for enclosing various missile components. The skin or shell of the warhead is comprised a plurality of pellets incorporated within the structural shell and forming a part thereof. The pellets are supported on a sheet explosive which is actuated to direct the pellets away from the missile body for impact with an incoming ICBM.

6 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

INTEGRAL STRUCTURAL WARHEAD SHELL

DEDICATORY CLAUSE

The invention described herein was made in the course of or under a contract or subcontract thereunder with the Government and may be manufactured, used, and licensed by or for the Government for governmental purposes without the payment to me of any royalties thereon.

BACKGROUND OF THE INVENTION

Certain types of anti-ballistic missiles incorporate a warhead designed to scatter hundreds of metal pellets in a predetermined pattern. The pellets provide a kill mechanism against ICBM's by forming a pattern through which the ICBM must travel to impact with a target. Upon impact between the ICBM and some of the pellets, the kinetic energy is such that the ICBM is destroyed.

In some missiles, the structure surrounding the warhead must be removed before firing and releasing the pellets. This is very difficult. Or, the entire pellet/explosive structure must be located outside the missile shell. The latter option requires that the strutural shell outer diameter of the nose portion of the missile be reduced to pass beneath the external warhead layer. This causes increased strutural weight and loss of bending stiffness of the missile body.

In the present invention the pellets and explosives are incorporated within the structural shell of the missile. No added structure is required underneath the warhead layer. Therefore, a straight load path is retained in the shell, reducing structural weight and bending deflection. This also results in maximum internal volume.

DESCRIPTION OF THE PREFERRED EMBODIMENT

Figure 1:
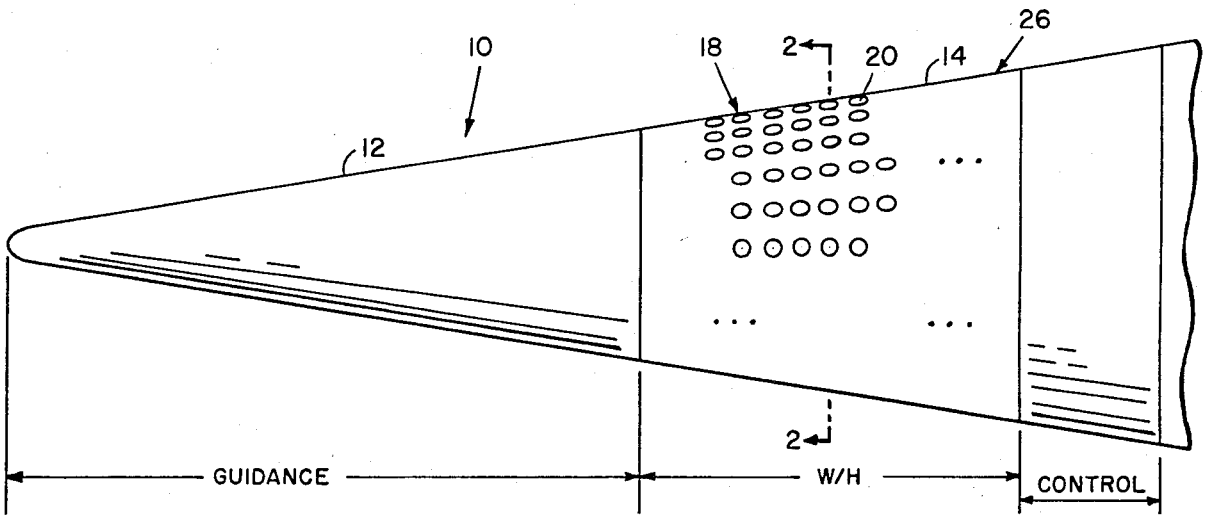
FIG. 1 is a partial elevational view of the forward portion of a missile showing a warhead section incorporating the structure of the present invention.
Figure 2:
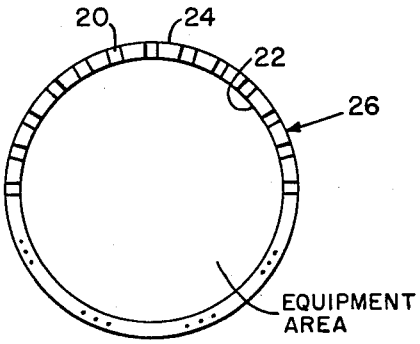
FIG. 2 is a sectional view of the missile taken along line 2—2 of FIG. 1.

As seen in FIG. 1, the forward section of a missile 10 is shown to include a guidance section 12, a warhead section 14, and a control section 16. Warhead section 14 is diagrammatially shown to include a plurality of annular assemblies 18 of pellets 20 which are disposed to be scattered in a predetermined pattern for impact with an ICBM. As seen in FIG. 2 the assemblies 18 are positioned around the missile intermediate the inner surface 22 and outer surface 24 which forms the missile shell 26.

Figure 3:
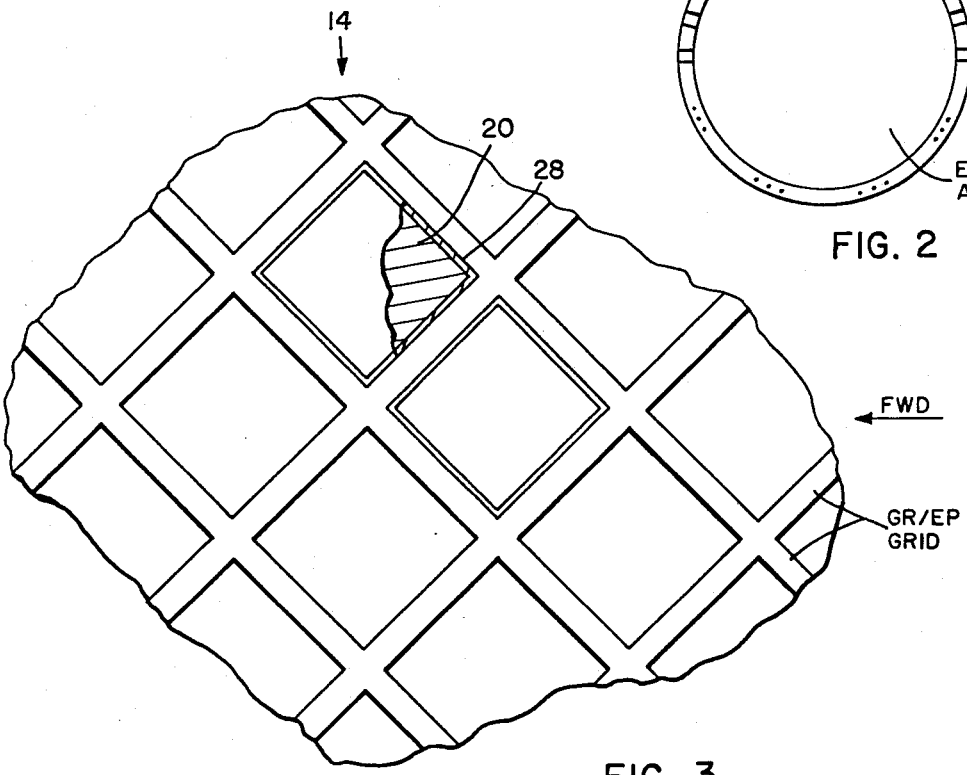
FIGS. 3 and 4 illustrate surface patterns of a warhead incorporating square or hexagonal configurations for housing the warhead of the present invention.
Figure 4:
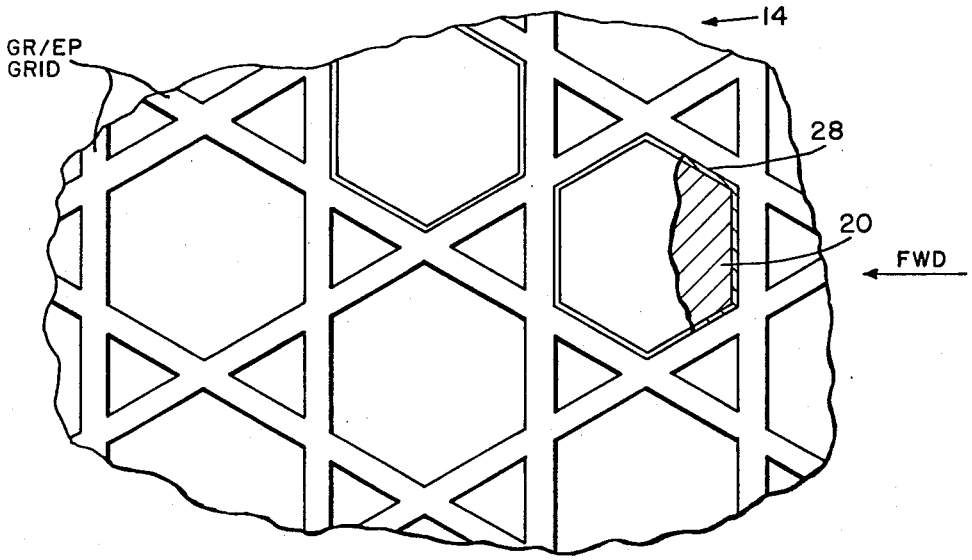

FIG. 3 illustrates a square surface pattern of a container 28 which houses the pellets 20 in the warhead section 14 of the missile 10. FIG. 4 illustrates a hexagonal surface pattern of a container 28 which houses pellets 20 in the warhead section 14 of the missile 10.

Each pellet 20 is contained in a thin metal shell or container 28 and a sheet explosive 30 (FIGS. 5 and 6) is positioned in the container beneath the pellet. The pellet shape on the external surface may be triangular, square, hexagonal or round. Typically, the pellet depth will usually equal the average pellet diameter.

A cylindrical or conical tooling mandrel is used to lay up the inner skin 22 of the warhead section shell. After cure, the inner shell is removed from the mandrel and pellet containers 28 of the desired pattern or light weight spaces 32 are positioned on the shell surface and bonded or riveted in place. Tows of graphite fiber 34 are then wet wound into the slots in a continuous criss-cross (basket-weave) manner (FIG. 6) until the slots are filled to the outer surface. Fibers 34 are held in position by an epoxy adhesive. Steps 36 for a bolted lap joint (FIG. 5) are machined into the solid laminate area at the forward and aft end of the section.

Figure 5:
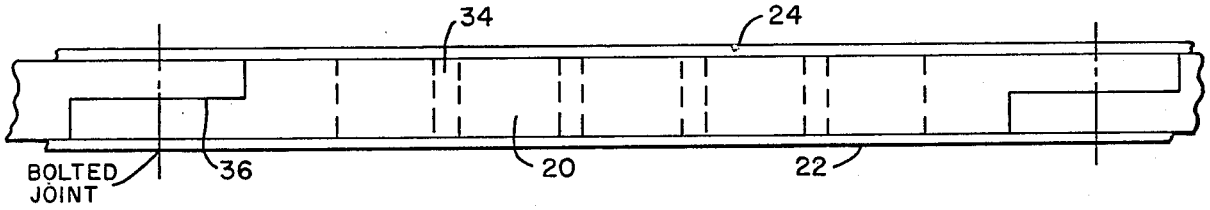
FIG. 5 is a sectional view taken along line 5—5 of FIG. 3 showing a bolted lap joint for joining sections of the warhead.
Figure 6:
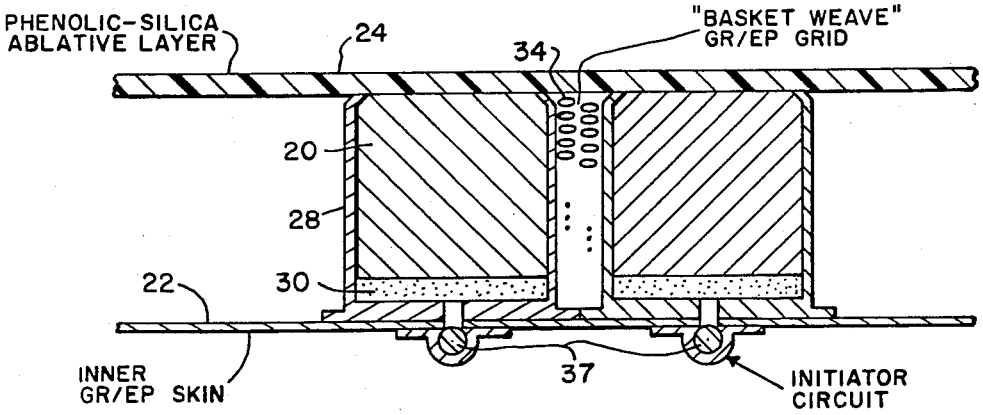
FIG. 6 is a view similar to FIG. 5 illustrating the use of an ablative layer for covering the warhead pellets and also illustrating an initiator circuit emplaced in the structure.

After completion of all other manufacturing steps, the containers of explosive and pellet are inserted into the openings and retained by bonding with silicone rubber adhesive. An initiator system 37 will be installed on the inside of the inner shell. If required, external thermal insulation (ablative coating) will be added to the overall outside surface after final assembly. (FIGS. 5 and 6).

This method of construction permits the surface warhead area to occupy a large percentage of the total shell area. The warhead can also be located along only one side or segment of the shell, giving a focused effect to the fragment pattern. Light weight spacers may be used to form the basket pattern in the non-warhead areas, lowering structural weight. Selective arrangement of internal equipment will maintain a balanced center of gravity.

I claim:

1. In a missile having a warhead section enclosing a plurality of pellets disposed for impact with an incoming target, said warhead section comprising:

a. a structural shell;

b. a plurality of pellet assemblies disposed around the periphery of said shell, said pellet assemblies including pellets disposed for expulsion from said missile shell for impact with an incoming target, said pellet assemblies and said missile shell forming an integral structural assembly; and;

c. explosive means for expelling said pellets from said missile shell.

2. A warhead shell assembly as in claim 1 including a plurality of pellet housings for enclosing each said pellet, said housings being in spaced relation around said warhead shell.

3. A warhead shell assembly as in claim 2 wherein said explosive means is a sheet explosive carried in each said pellet housing beneath said pellet, and, an initiator adjacent said sheet explosive for actuation thereof.

4. A warhead shell assembly as in claim 3 including tows of graphite fiber disposed in layers in the spaces between said pellet assemblies, said graphite layers being secured in position by an epoxy adhesive.

5. A warhead shell assembly as in claim 4 including thermal insulating means disposed over said pellet assemblies and around said missile shell.

6. A warhead shell assembly as in claim 5 wherein said insulating means is comprised of ablative material.

* * * * *